(12) United States Patent
Kajihara

(10) Patent No.: US 8,433,122 B2
(45) Date of Patent: Apr. 30, 2013

(54) METHOD AND APPARATUS FOR PROCESSING MASS ANALYSIS DATA

(75) Inventor: Shigeki Kajihara, Uji (JP)

(73) Assignee: Shimadzu Corporation, Kyoto (JP)

( * ) Notice: Subject to any disclaimer, the term of this patent is extended or adjusted under 35 U.S.C. 154(b) by 176 days.

(21) Appl. No.: 13/039,200

(22) Filed: Mar. 2, 2011

(65) Prior Publication Data

US 2011/0216952 A1    Sep. 8, 2011

(30) Foreign Application Priority Data

Mar. 5, 2010    (JP) ................. 2010-048878

(51) Int. Cl.
*G06K 9/00* (2006.01)
*G01V 3/00* (2006.01)
*G01T 3/06* (2006.01)

(52) U.S. Cl.
USPC ....... 382/133; 250/390.07; 324/307; 324/318

(58) Field of Classification Search .......... 382/128–134; 324/76.19, 76.22, 307, 310, 312, 318; 250/339.07, 250/339.08, 390.07, 390.08
See application file for complete search history.

(56) References Cited

U.S. PATENT DOCUMENTS

| | | | |
|---|---|---|---|
| 7,054,038 B1 * | 5/2006 | Ostromoukhov et al. | ... 358/3.13 |
| 7,960,691 B2 * | 6/2011 | Matsuo | ......... 250/282 |
| 2003/0078739 A1 * | 4/2003 | Norton et al. | .......... 702/22 |

FOREIGN PATENT DOCUMENTS

| | | |
|---|---|---|
| JP | 2007-066533 | 3/2007 |
| JP | 2007-157353 | 6/2007 |
| JP | 2007-257851 | 10/2007 |

OTHER PUBLICATIONS

Kiyoshi Ogawa et al., "Research and Development of Mass Microscope", Shimadzu Review, Mar. 31, 2006, vol. 62, Nos. 3-4, pp. 125-135.

Takahiro Harada et al., "Biological Tissue Analysis using Mass Microscope", Shimadzu Review, Apr. 28, 2008, vol. 64, Nos. 3-4, pp. 139-146.

Search for Biomarkers on Pathological Samples Using MS Imaging Technology, Shimadzu Corporation, Feb. 25, 2010 http://www.an.shimadzu.co.jp/bio/biomarker/297-0425_msimaging.pdf.

H. Morinaga et al., "Development of the Software Using Principal Component Analysis for MS Imaging Data", Abstract of the 57th Annual Conference on Mass Spectrometry 2009, Journal of Spectrometry Society of Japan, May 1, 2009.

* cited by examiner

*Primary Examiner* — Abolfazl Tabatabai
(74) *Attorney, Agent, or Firm* — DLA Piper LLP (US)

(57) ABSTRACT

The present invention aims at providing a method and apparatus for presenting, based on an enormous amount of data collected by an imaging mass analysis, information which is significant for understanding the tissue structure and other information of a biological sample and which is intuitively easy to understand to analysis operator. For each pixel $8b$ on a sample $8$, the mass-to-charge ratio m/z (i) corresponding to the maximum intensity MI(i) in the mass spectrum is extracted, and all the pixels are grouped into clusters in accordance with their m/z (i). One cluster corresponds to one substance. Then, the largest maximum intensity MI(i) among the maximum intensities of the pixels included in a cluster is extracted as the representative maximum intensity MI(cj) for each cluster, and these representative maximum intensities MI(cj) are displayed with cluster number cj. When an operator specifies one or more clusters to be displayed by reference to these MI(cj), different colors respectively are assigned to the specified clusters, and a cluster image in which the pixels included in each cluster are colored is created and displayed. On the cluster image, the spatial distributions of a plurality of substances are shown in different colors. Simultaneously, an integrated mass spectrum of all the pixels is displayed, in which the peaks corresponding to the selected clusters are colored in the same color as in the cluster image.

6 Claims, 8 Drawing Sheets

Fig. 5
(a) OPTICAL MICROSCOPE IMAGE
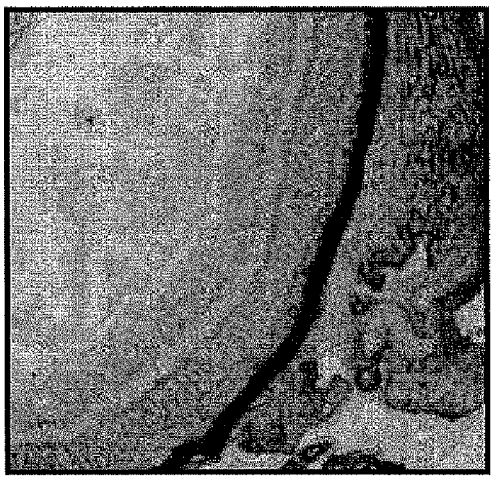
(b) MASS ANALYSIS IMAGE OF m/z 761
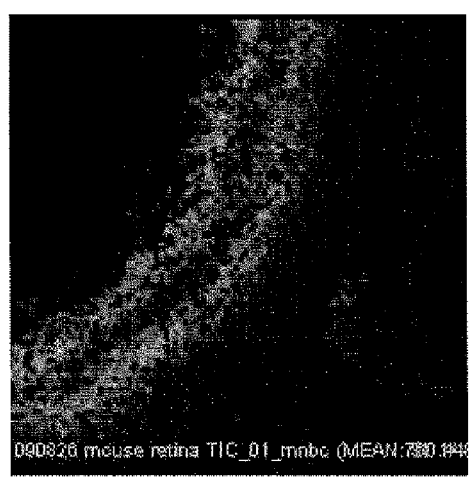
(c) INTEGRATED MASS SPECTRUM OF ALL THE PIXELS
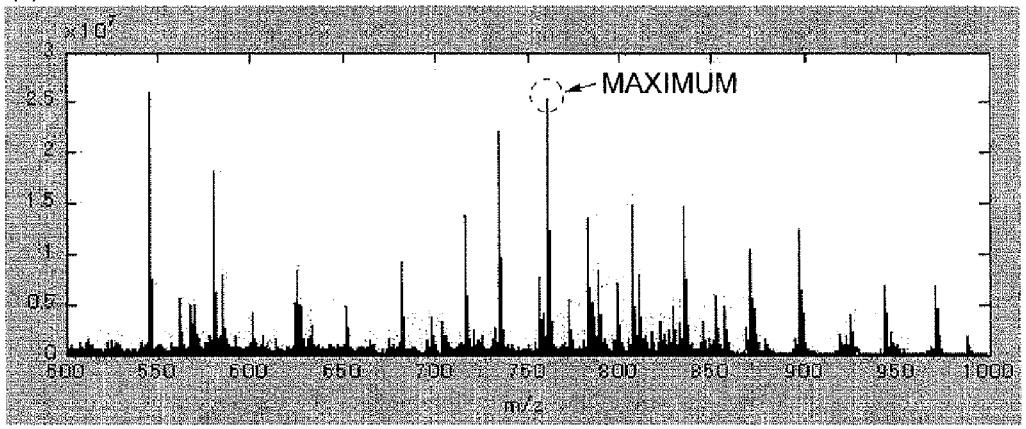
(d) MASS SPECTRUM OF PIXEL NUMBER i=5
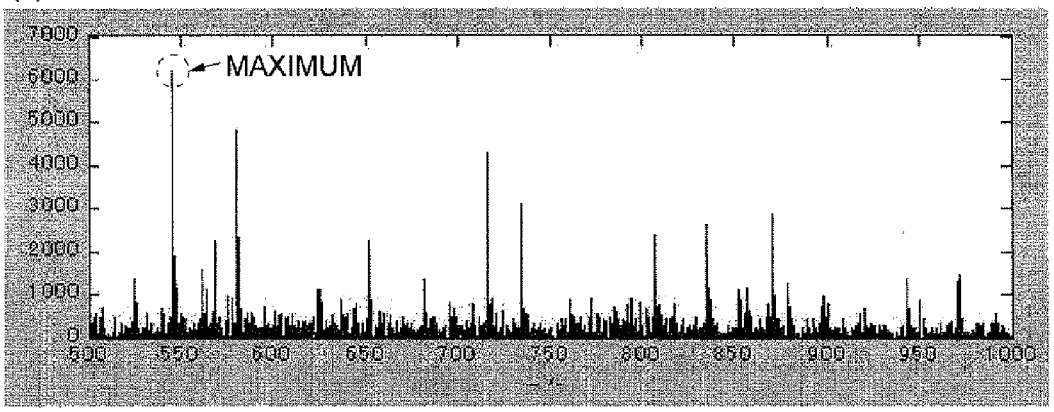

Fig. 6
(a) CLUSTER IMAGE
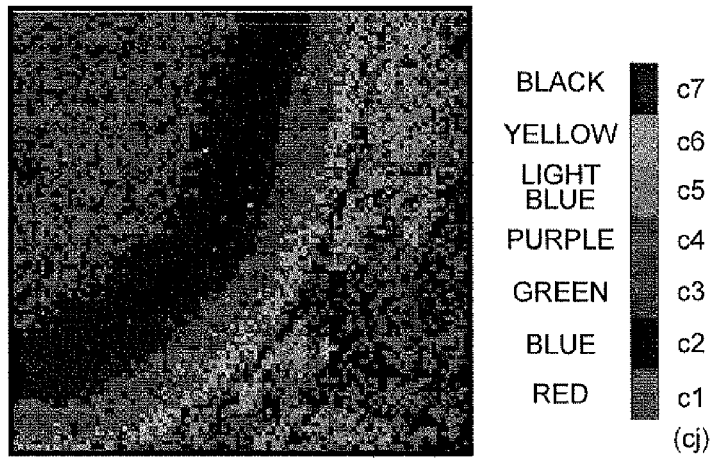
BLACK  c7
YELLOW c6
LIGHT BLUE c5
PURPLE c4
GREEN  c3
BLUE   c2
RED    c1
(cj)
(b) INTEGRATED MASS SPECTRUM
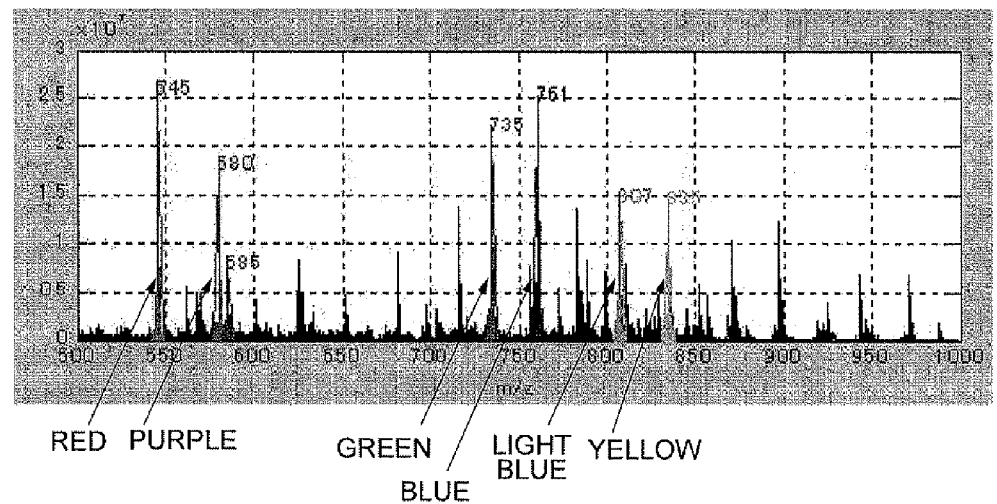
RED  PURPLE    GREEN / LIGHT  YELLOW
                BLUE  BLUE Fig. 7
(a) OPTICAL MICROSCOPE IMAGE
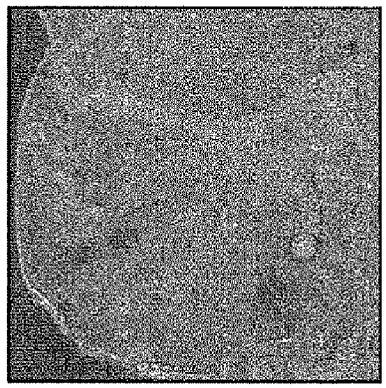
(b) CLUSTER IMAGE AND INTEGRATED MASS SPECTRUM
WHERE CLUSTER NUMBERS c1 - c6 ARE DISPLAYED
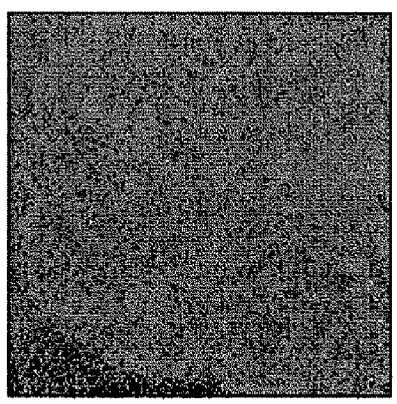 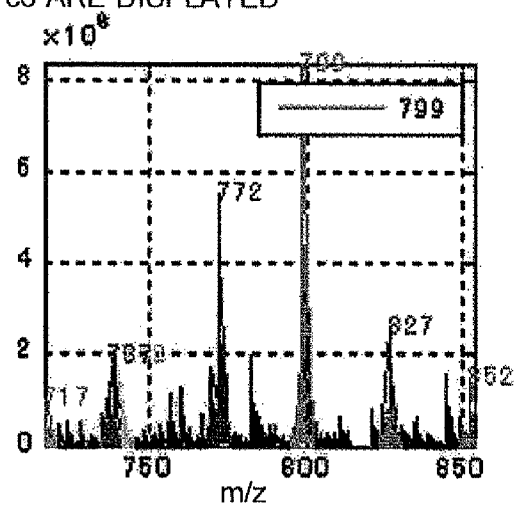
(c) CLUSTER IMAGE AND INTEGRATED MASS SPECTRUM
WHERE CLUSTER NUMBERS c3 - c8 ARE DISPLAYED
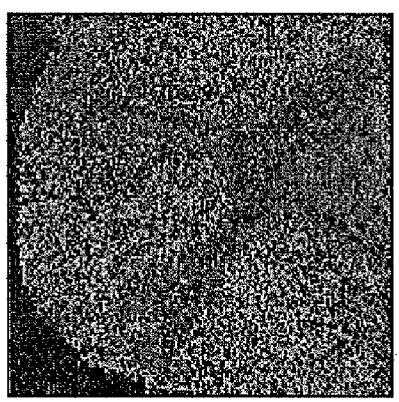 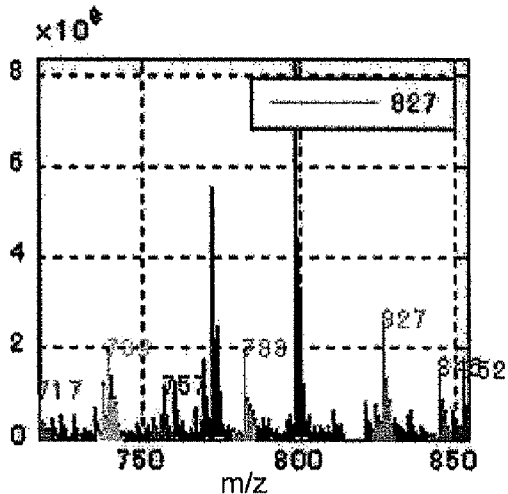

Fig. 8
(a) OPTICAL MICROSCOPE IMAGE
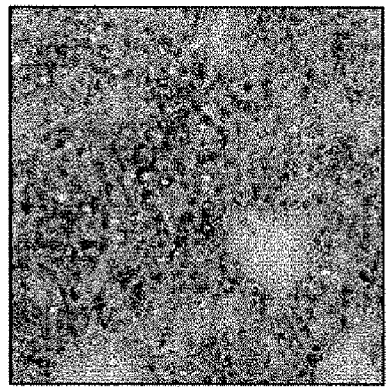
(b) CLUSTER IMAGE AND INTEGRATED MASS SPECTRUM
WHERE CLUSTER NUMBERS c1 - c6 ARE DISPLAYED
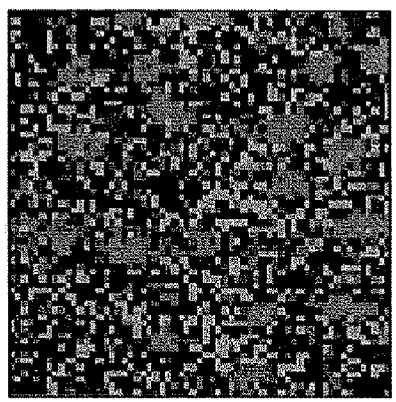 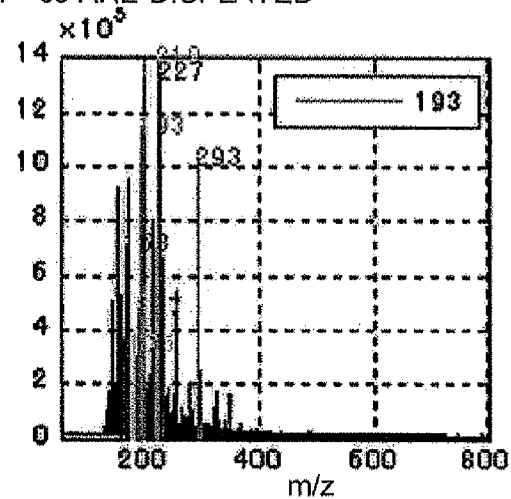
(c) CLUSTER IMAGE AND INTEGRATED MASS SPECTRUM
WHERE CLUSTER NUMBERS c3 - c8 ARE DISPLAYED
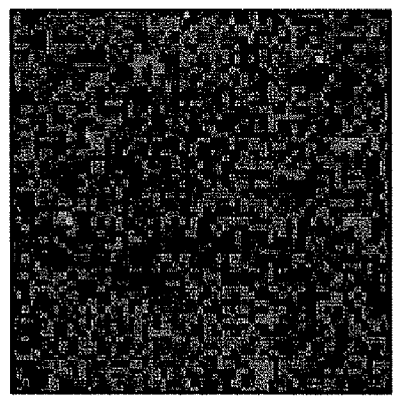 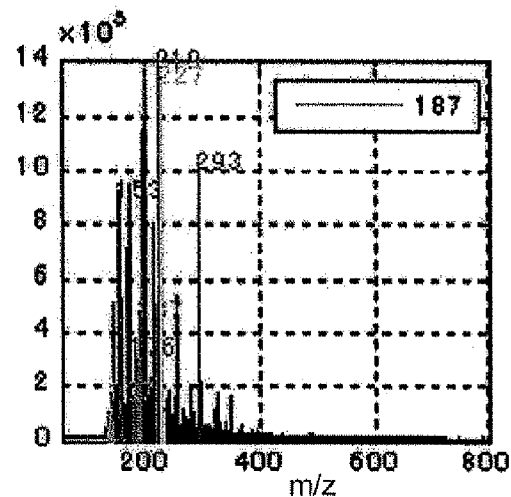

Fig. 9
m/z 772.5  m/z 798.5 
m/z 806.5 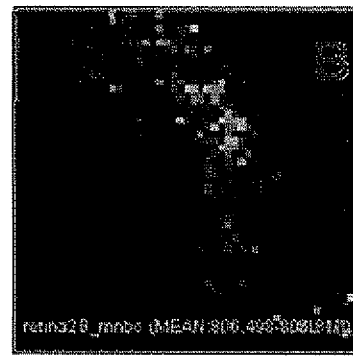 m/z 872.4 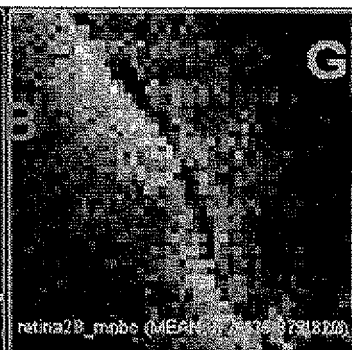
Fig. 10

METHOD AND APPARATUS FOR PROCESSING MASS ANALYSIS DATA

The present invention relates to a mass analysis data processing method and a mass analysis data processing apparatus for analyzing mass spectrometric imaging data which are collected by performing a mass analysis for a plurality of micro areas in a two-dimensional area of a sample.

BACKGROUND OF THE INVENTION

In order to observe the morphology of a sample such as a biological tissue and simultaneously measure the distribution of the molecules existing in a specified area on the sample, apparatuses called a mass microscope or an imaging mass spectrometer have been developed (refer to: JP-A 2007-66533; JP-A 2007-157353; JP-A 2007-257851; Kiyoshi Ogawa et al., "Kenbi Shitsuryo Bunseki Sochi no Kaihatsu," ("Research and Development of Mass Microscope") *Shimadzu Review*, Shimadzu Corporation, Mar. 31, 2006, vol. 62, nos. 3•4, pp. 125-135; Takahiro Harada et al., "Kenbi Shitsuryo Bunseki Sochi ni yoru Seitai Soshiki Bunseki," ("Biological Tissue Analysis using Mass Microscope") *Shimadzu Review*, Shimadzu Corporation, Apr. 24, 2008, vol. 64, nos, 3•4, pp. 139-146; and other documents). These apparatuses require no grinding or crushing of the sample and hence are capable of obtaining a distribution image (or mapping image) of the ions having a specific mass-to-charge ratio ink included in any area on the sample specified based on a microscopic observation can be obtained while almost completely maintaining the original morphology of the sample. These apparatuses are expected to be used, for example, to obtain distribution information of the proteins included in a living cell, particularly in the fields of biochemistry, medical care, or pharmaceutical chemistry, and other fields.

It is important for an analysis operator to easily grasp desired information on a sample, e.g. the kind of the substance that characterizes the sample or the distribution of the amount of that substance. To this end, an appropriate analysis processing should be performed to the collected mass spectrometric imaging data and the result of the processing should be displayed in an appropriate form. If mass spectrometric imaging data are obtained for a two-dimensional area of a certain area on a sample, the data will include mass spectrum data of many measurement points (micro areas). Naturally, the amount of these data is enormous. Given this factor, a variety of methods have been proposed to handle such an enormous amount of data and extract meaningful information in an easy-to-understand fashion for the analysis operator.

In one method, for example, an integrated mass spectrum which is obtained by integrating the mass spectra of all measurement points is displayed on a display window. After the analysis operator selects an appropriate peak among the peaks appearing on the integrated mass spectrum, the intensity spatial distribution of the selected peak is displayed by using a commonly available MS image display software product, such as BioMap (for example, refer to "MS Imaging Gijutsu niyoru Byori Soshiki Seppen jou ni okeru Biomarker no Tansaku," ("Search for Biomarkers on Pathological Samples using MS Imaging Technology") which is described on Shimadzu Corporation's website. FIG. 9 shows examples of the spatial distribution of the peak intensity for different mass-to-charge ratios obtained by this method, and FIG. 10 shows an example of a superimposed image of these spatial distributions. Superimposing the spatial distributions of the intensity of two or more peaks in this manner provides information relating to the structure of a specified tissue and the mass-to-charge ratio of the main substance of the tissue.

In another method, a multivariate analysis is used, such as a principal component analysis (PCA), an independent component analysis (ICA), a factor analysis (FA), and other analysis (refer to Morinaga et al., "Development of the software using Principal Component Analysis for MS Imaging Data," Abstract of the 57th Annual Conference on Mass Spectrometry 2009, *Journal of Spectrometry Society of Japan*, May 1, 2009 and other documents). In a multivariate analysis, two or more substances forming close intensity spatial distributions gather by factors. Generally, a score and a loading are displayed in terms of each of the factors. In the method described by Morinaga et al., the score is displayed as a two-dimensional spatial distribution, and the loading as a scatter diagram.

However, the previously described conventional methods have the following disadvantages:

In an analysis method using MS image display software, when an analysis operator selects a peak on an integrated mass spectrum, the intensity spatial distribution for a mass-to-charge ratio corresponding to the selected peak is displayed. This method does not guarantee that the selected peak always corresponds to a substance that shows a spatially specific distribution. If a peak showing a spatially specific distribution must be located for each micro area on a sample, the analysis operator needs to compare and superimpose the intensity spatial distributions of two or more peaks by trial and error. Consequently, the operator generally has to repeat the operation of displaying images for many peaks on the integrated mass spectrum, which requires a large amount of labor and time.

In a method using a multivariate analysis, specialized knowledge and skills are required in many cases to determine the number of factors and interpret the loading value of each factor. In the case of PCA, a peak having a negative intensity may be included on a displayed mass spectrum of a main component and hence it is sometimes difficult to interpret the physical meaning of the result. Therefore, not everyone can perform the analysis, which makes it difficult to efficiently perform an analysis and enhance the throughput. Another disadvantage of the PCA method exists in that the information obtained by this method is insufficient for determining the spatial distribution or content of a substance since the spatial distribution obtained by PCA shows only one main component while information relating to the substance is reflected on a plurality of main components.

SUMMARY OF THE INVENTION

The present invention has been developed to solve the aforementioned problems, and the objective thereof is to provide a mass analysis data processing method and a mass analysis data processing apparatus capable of efficiently handling a large amount of data collected by an imaging mass analysis to present significant information for the analysis of the tissue structure of a biological sample or other objects in an intuitively understandable form for analysis operators.

To solve the aforementioned problems, the first aspect of the present invention provides a mass analysis data processing method for processing data collected by performing a mass analysis on each of a plurality of micro areas set within a two-dimensional area on a sample, including:

a) a first step for extracting a mass-to-charge ratio giving a maximum intensity for each of the micro areas, based on mass spectrum data corresponding to the micro area;

b) a second step for distributing the micro areas into a plurality of clusters based on the mass-to-charge ratio obtained in the first step; and c) a third step for creating a colored two-dimensional image corresponding to a whole or a part of the two-dimensional area by assigning, for given one or more clusters among the plurality of clusters, a display color to a micro area or micro areas belonging to the clusters, the display color being different for each cluster, and for displaying the colored two-dimensional image.

Preferably, the mass, analysis data processing method according to the first aspect of the present invention may further include:

d) a fourth step for obtaining an integrated mass spectrum by integrating the mass spectrum data corresponding to all the micro areas; and e) a fifth step for displaying the integrated mass spectrum, while assigning a same color of the cluster or clusters to which the display color has been assigned in the third step to a peak or peaks corresponding to the cluster or clusters.

The second aspect of the present invention provides a mass analysis data processing apparatus for processing data collected by performing a mass analysis on each of a plurality of micro areas set in a two-dimensional area on a sample, including:

a) an information extracting means for extracting a mass-to-charge ratio giving a maximum intensity for each of the micro areas, based on mass spectrum data corresponding to the micro area;

b) a clustering means for distributing the micro areas into a plurality of clusters based on the mass-to-charge ratio obtained by the information extracting means; and c) a display information forming means for creating a colored two-dimensional image corresponding to a whole or a part of the two-dimensional area by assigning, for given one or more clusters among the plurality of clusters, a display color to a micro area or micro areas belonging to the clusters, the display color being different for each cluster, and for displaying the colored two-dimensional image.

The data that are processed by the mass analysis data processing method and the mass analysis data processing apparatus according to the first and second aspects of the present invention include mass spectrum data which indicate the relationship between the mass-to-charge ratio and the signal intensity (or ion intensity) at each micro area. In the mass analysis data processing apparatus according to the second aspect of the present invention, the information extracting means searches the mass spectrum data of each micro area for a peak having the largest signal intensity and extracts the mass-to-charge ratio which corresponds to that peak. The reason a peak having the maximum intensity is searched for is that this peak probably corresponds to the most abundant substance in each micro area.

The maximum intensity may be searched for without specifically limiting the mass-to-charge ratio range (i.e. across the entire mass-to-charge ratio range which is measured in a mass spectrum). However, in the case where the mass-to-charge ratio range of the substance which will be analyzed is known in advance, narrowing the mass-to-charge ratio range to be searched is advantageous in that the searching time can be reduced and a detection of an inappropriate peak can be avoided. Conversely, if there is a previously known value or range of mass-to-charge ratio that should be excluded from the analysis, such a value or range may be preferably excluded in the process of searching for the maximum intensity. Such a situation can occur, for example, in matrix assisted laser desorption ionization (MALDI), in which any peak originating from the substance used as a matrix should be disregarded.

Given these factors, in the mass analysis data processing apparatus according to the second aspect of the present invention, the information extracting means may preferably extract a mass-to-charge ratio giving the maximum intensity for a specified mass-to-charge ratio range, or for a mass-to-charge ratio range excluding a specified value or range of the mass-to-charge ratio.

Once the mass-to-charge ratio giving the largest intensity is obtained for each of the micro areas, the clustering means distributes the micro areas into a plurality of clusters based on their mass-to-charge ratios. For example, micro areas having the same mass-to-charge ratio may be grouped. More practically, micro areas included in a mass-to-charge ratio range with a given allowable width may be handled as one group. By appropriately setting this allowable range (approximately a few Da), the isotopic peaks originating from the same substance can be included into the same cluster. It goes without saying that the total number of clusters varies depending on the sample (normally on the number of contained substances).

The display information forming means assigns a different display color to each of the specified clusters among a plurality of clusters created by the clustering means so that they can be easily distinguished on the screen, and displays, on the display window, a colored two-dimensional image corresponding to the whole or a part of the two-dimensional area. As a result, micro areas having the maximum peak intensity at the same or approximately the same mass-to-charge ratio on their mass spectra are displayed in the same color on the colored two-dimensional image (or on a mass spectrometric cluster image).

As previously described, the substance which corresponds to the peak giving the maximum intensity is deduced to be the main substance which is most abundantly contained in the corresponding micro area, and the micro areas that belong to the same cluster probably contain the same main substance. In the colored two-dimensional image, the micro areas containing the same main substance are displayed in the same color, whereby the spatial distribution of the same substance can be easily and intuitively grasped. By displaying the micro areas that belong to the same cluster in the same color and by using a different color for each cluster, the spatial distribution of a plurality of substances can be visually presented on one colored two-dimensional image.

Generally, even in the case where the number of clusters is considerably large, the number of substances which are important in grasping the tissue structure of a biological sample is not very large; a spatial distribution showing a number of selected substances can provide sufficient information. If the number of colors simultaneously used in one colored two-dimensional image is too large, the image would become too complicated for the analysis operator to understand, rather than facilitating the understanding. Hence, in the mass analysis data processing method according to the present invention, it is preferable to allow the operator to arbitrarily select one or more clusters which should be colored when displayed.

Probably, the larger the signal intensity of a substance is, the more the substance is contained. Generally, the spatial distribution of such a substance is important in many cases. Therefore, in order to assist the analysis operator in selecting a cluster, it is preferable to extract, for each cluster, the micro area having the largest maximum signal intensity among the micro areas belonging to the cluster. The largest maximum intensity may be displayed as the intensity value representing the cluster. Further, the clusters may be sorted in descending order of the intensity so that one or more clusters can be selected in that order. This allows the operator to appropriately select one or more substances and check the spatial distribution of the selected substances on one colored two-dimensional image.

The mass analysis data processing apparatus according to the second aspect of the present invention may further include an integral computing means for obtaining an integrated mass spectrum by integrating the mass spectrum data corresponding to all the micro areas, wherein the display information forming means displays the integrated mass spectrum on the display window while assigning a same color of the cluster or clusters to which the display color has been assigned in creating the colored two-dimensional image to a peak or peaks corresponding to the cluster or clusters.

In this case, the integrated mass spectrum and the colored two-dimensional image may be preferably displayed on the same display window. The analysis operator can check the spatial distribution of a substance on the colored two-dimensional image and simultaneously check the peak or peaks in the same color displayed on the integrated mass spectrum, whereby the substance can be deduced from the mass-to-charge ratio and the content of the substance can be roughly estimated from the peak intensity.

The display information forming means may also display at least the value of a mass-to-charge ratio corresponding to the colored peak or peaks on the integrated mass spectrum displayed on the display window. This enables accurate recognition of the mass-to-charge ratio, which facilitates the deduction of the kind of a substance.

With the mass analysis data processing method and the mass analysis data processing method according to the present invention, it is possible to process an enormous amount of data collected by an imaging mass analysis to form information in which the spatial distribution of one or more substances contained in a sample can be easily and intuitively understood and present that information to the analysis operator. In particular, the spatial distributions of a plurality of substances can be clearly and simultaneously shown on one colored two-dimensional image. These features contribute much to the understanding of the tissue structure of a biological sample and other facts for example.

The mass analysis data processing method and the mass analysis data processing apparatus according to the present invention require neither repeated peak selecting operations by trial and error nor a peak extracting process which is generally necessary in performing a multivariate analysis. Therefore, the processing time is shortened and the throughput is increased. In addition, specialized knowledge and skills as required in the methods using the multivariate analysis are not required to perform the analysis operation and interpret the result of the analysis, which advantageously alleviates the burden of the analysis operator.

BRIEF DESCRIPTION OF THE DRAWINGS

FIG. 5 shows an optical microscope image, a mass spectrometric image, and mass spectra of a sample used in an experiment.

FIG. 6 shows an example of the result of a data processing of the sample shown in FIG. 5.

FIG. 7 shows an optical microscope image, cluster images, and integrated spectra obtained by an actual measurement for a sample of a mouse brain.

FIG. 8 shows an optical microscope image, cluster images, and integrated spectra obtained by an actual measurement for a sample of a ginger slice.

FIG. 9 shows a display example of the intensity spatial distributions for different mass-to-charge ratios obtained by a conventional method.

FIG. 10 shows a display example of a superimposed image of the intensity spatial distributions shown in FIG. 9.

EXPLANATION OF THE NUMERALS

1 . . . Imaging Mass Spectrometry Unit
2 . . . Data Processor
3 . . . Data Memory
4 . . . Microscope Image Processor
5 . . . Controller
6 . . . Operation Unit
7 . . . Display Unit
8 . . . Sample
8a . . . Two-Dimensional Measurement Area
8b . . . Micro Area (Pixel)

DETAILED DESCRIPTION OF A PREFERRED EMBODIMENT

Figure 1:
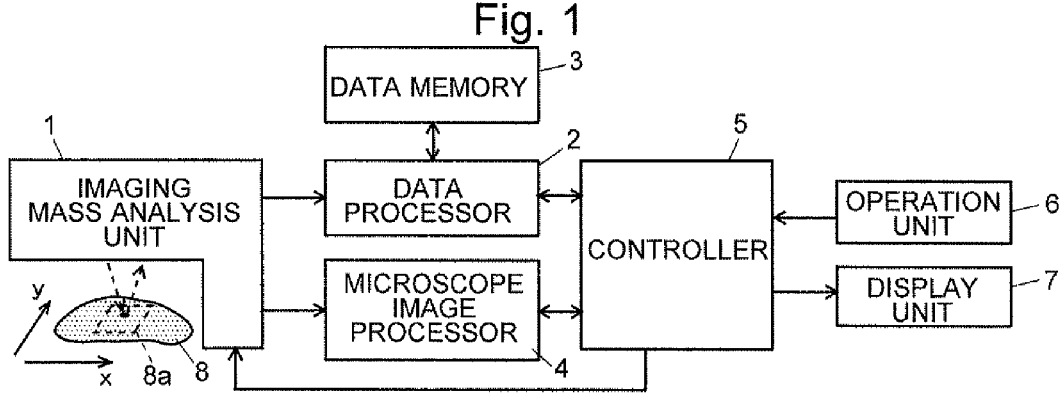
FIG. 1 is a schematic configuration diagram of an embodiment of an imaging mass spectrometer which uses the mass analysis data processing apparatus according to the present invention.

An embodiment of an imaging mass spectrometer which uses a mass analysis data processing apparatus according to the present invention will be described with reference to the attached figures, FIG. 1 is a schematic configuration diagram of the imaging mass spectrometer according to the present embodiment.

This imaging mass spectrometer includes; an imaging mass analysis unit 1 for performing a microscopic observation of a two-dimensional measurement area 8a on a sample 8 and for performing an imaging mass analysis within the area 8a; a data processor 2 for analyzing and processing the mass analysis spectrum data collected by the imaging mass analysis unit 1; a data memory 3 for memorizing the mass analysis data spectrum data; a microscope image processor 4 for processing the signal of an image photographed by the imaging mass analysis unit 1 and for forming a microscope image; a controller 5 for controlling the aforementioned units; and an operation unit 6 and a display unit 7, which are connected to the controller 5.

The imaging mass analysis unit 1 includes, for example, a MALDI ion source, an ion transport optical system, an ion trap, a time-of-flight mass analyzer, and other units, as described in the previously mentioned papers by Ogawa et al, and Harada et al. The imaging mass analysis unit 1 performs a mass analysis across a given mass-to-charge ratio range for a micro area of a predetermined size. Although not shown, the imaging mass analysis unit 1 includes a driving unit for accurately moving a sample stage, in biaxial directions of x and y, on which the sample 8 is placed. By performing a mass analysis every time the sample 8 is moved by a predetermined step width, the mass analysis spectrum data for given areas can be collected. At least a portion of the functions of the controller 5, the data processor 2, the data memory 3, the microscope image processor 4, and other units is realized by running a dedicated processing-controlling software program installed in a personal computer.

Figure 2:
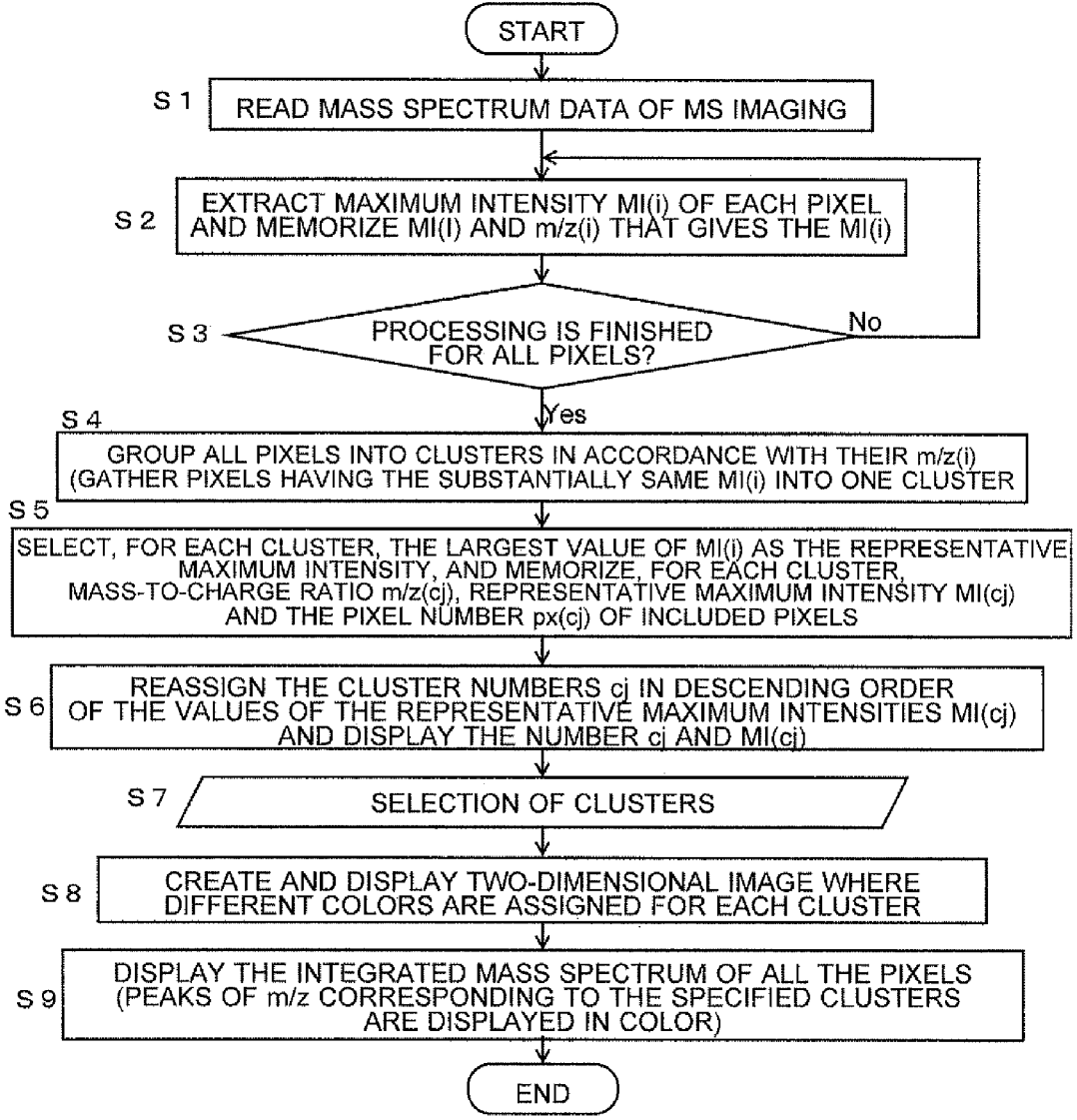
FIG. 2 is a flowchart of a data processing procedure in the imaging mass spectrometer of the present embodiment.

The imaging mass spectrometer of the present embodiment is characterized by the data processing performed by the data processor 2 to analyze and process an enormous amount of mass analysis spectrum data collected by the imaging mass analysis unit 1 and display the result of the analysis in the window of the display unit 7. An embodiment of this characterizing data processing will be described in detail with reference to FIGS. 2 through 4. FIG. 2 is a flowchart illustrating the procedures of the data processing, and FIGS. 3 and 4 are schematic diagrams for explaining the process of FIG. 2.

Figure 3:
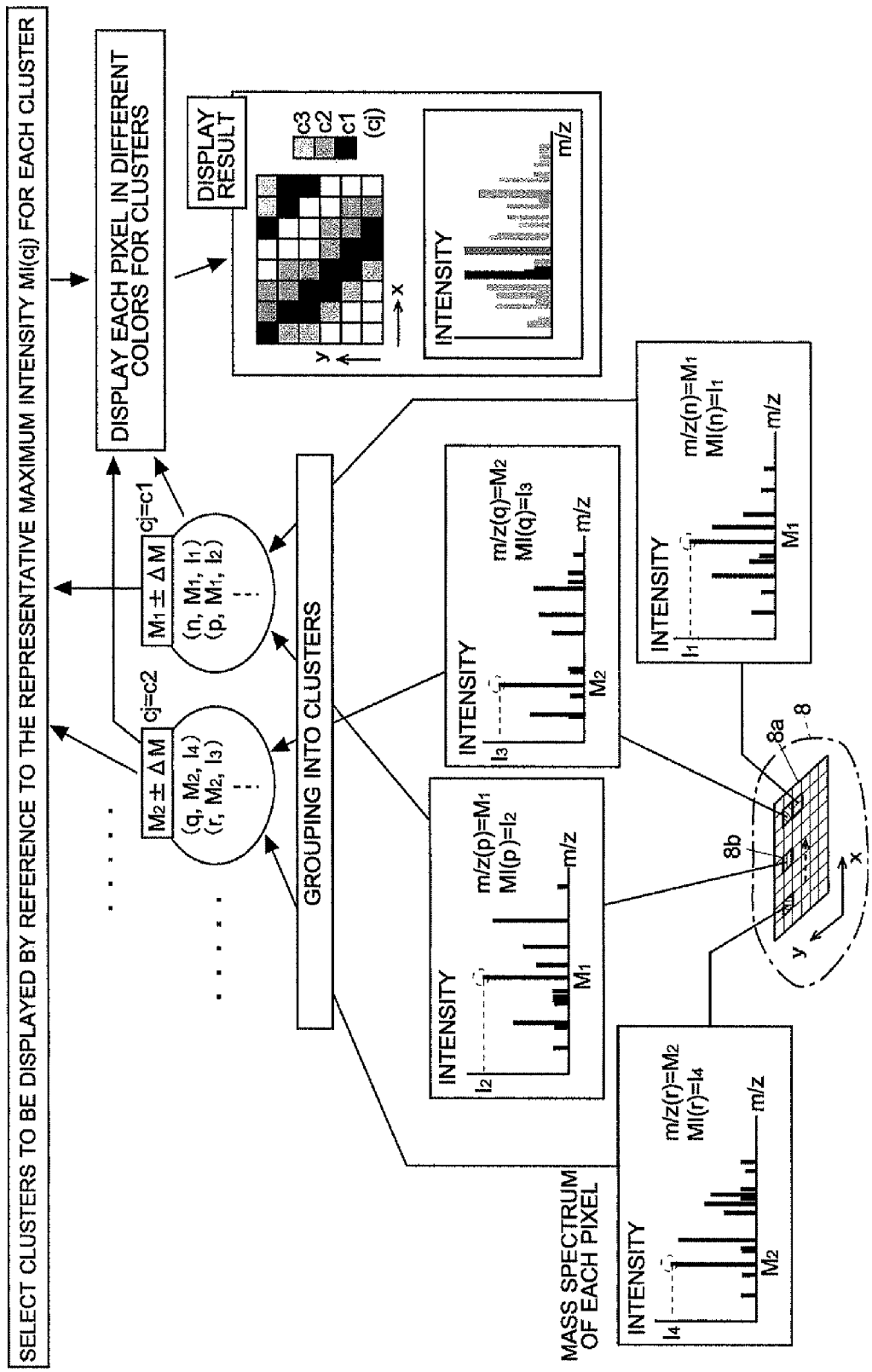
FIG. 3 is an explanation diagram of the data processing in the imaging mass spectrometer of the present embodiment.
Figure 4:
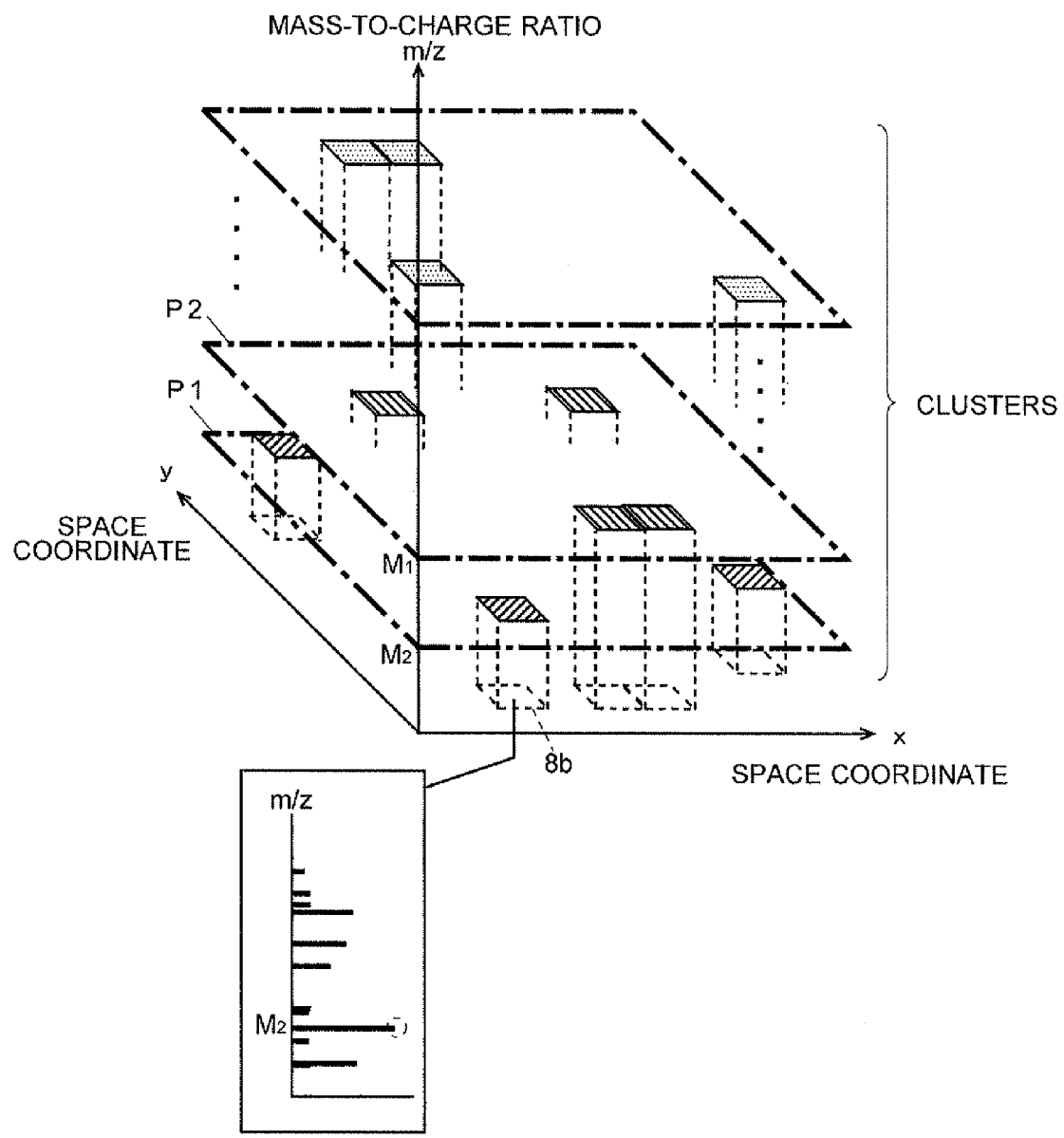
FIG. 4 is an explanation diagram of the data processing in the imaging mass spectrometer of the present embodiment.

In the imaging mass analysis unit 1, mass spectrum data can be obtained for each of the micro areas 8b, which are micro-sized segments arranged in both x and y directions within a given two-dimensional measurement area 8a on the sample 8, as illustrated in FIG. 3. These mass spectrum data constitute mass spectra each of which shows an intensity signal across a predetermined mass-to-charge ratio range.

Generally, the length of each side of the micro area 8b is determined by the movement step width of the stage on which the sample 8 is placed. By performing the data processing which will be described later, the display color of one micro area 8b on the colored two-dimensional image is selected based on the mass spectrum data obtained for that micro area 8b. The micro area is therefore the minimum unit in performing an image processing such as coloring. Hence, in the present image processing, one pixel is synonymous with one micro area. In the following explanation, the micro area will be called the pixel. As illustrated in FIG. 3, the pixels are arranged in a grid pattern in the two-dimensional measurement area 8a. In this embodiment, identification numbers (i=1 through N) are given to the pixels according to a predetermined rule so that each number corresponds to the position coordinates of one pixel.

On receiving an order of the initiation of a data processing, the data processor 2 accesses the data memory 3 to read all the mass analysis imaging data which are to be processed, i.e. the mass spectrum data obtained for all the aforementioned N pixels (Step S1).

Next, in the order of the pixel numbers for example, the mass spectrum data corresponding to one pixel are analyzed to extract and memorize the maximum intensity (MI) of the peak signal among all the peaks appearing on the mass spectrum and the mass-to-charge ratio which gives the maximum intensity (Step S2). In Step 3, whether or not all the pixels have undergone the aforementioned processing is determined. If there is any pixel remaining, the process returns to Step S2.

In FIG. 3, four mass spectrum data corresponding to four pixels with the pixel numbers n, p, q and r are shown. The maximum intensity corresponding to the pixel number i is expressed as MI(i) and the mass-to-charge ratio corresponding thereto is expressed as m/z(i). For example, in the pixel with pixel number n, the maximum intensity MI(n)=$I_1$, and the corresponding mass-to-charge ratio m/z(n)=$M_1$. In the pixel with pixel number p, the maximum intensity MI(p)=$I_2$, and the corresponding mass-to-charge ratio m/z(p)=$M_1$. The same processing is repeated for all N pixels by repeating Steps S2 and S3. As a consequence, for all N pixels, the maximum intensities MI(1) through MI(N) and the mass-to-charge ratios m/z(1) through m/z(N) are collected and memorized.

It can be deduced that the substance corresponding to the peak giving the maximum intensity on a mass spectrum is the substance which is most abundantly contained in the pixel, Hence, the operation of searching for the maximum intensity for each pixel, which was described earlier, corresponds to a search for the most abundant substance in that pixel.

In the next step, the N pixels are grouped into clusters in accordance with their mass-to-charge ratio m/z(i) (Step S4). In particular, the present clustering process creates one cluster by collecting the pixels whose mass-to-charge ratios m/z (i) fall within a predetermined allowable range (M±ΔM, where M is a central mass-to-charge ratio) rather than collecting only the pixels having the same mass-to-charge ratio m/z(i). As a result, a plurality of clusters are created. By appropriately setting ΔM, not only the measurement errors can be absorbed, but an isotopic peak or peaks originating from the same substance can be included in the same cluster. In the example of FIG. 3, the mass-to-charge ratio m/z(n) of the pixel with pixel number n and the mass-to-charge ratio m/z(p) of the pixel with pixel number p have the same value of $M_1$. Hence, these two pixels are grouped into the same cluster with a mass-to-charge ratio range of $M_1$±ΔM. Similarly, the mass-to-charge ratio m/z(q) of the pixel with pixel number q and the mass-to-charge ratio m/z(r) of the pixel of pixel number r have the same value of $M_2$. Hence, these two pixels are grouped into another cluster with a mass-to-charge ratio range of $M_2$±ΔM.

Under the aforementioned assumption that the peak giving the largest intensity on a mass spectrum corresponds to the most abundant substance and each peak corresponds to one substance, it can be said that pixels having approximately the same mass-to-charge ratio m/z(i) have the same substance as the most abundant substance. That is to say, the previously described clustering operation is aimed at creating a plurality of clusters each of which is composed of pixels having the same substance as the most abundant substance. In this embodiment, cluster numbers cj (j=1, 2, 3, . . . ) are given to the created clusters. At this point in time, the cluster number cj can be given in ascending order of the mass-to-charge ratio.

After all the pixels are grouped into clusters, the largest value of the maximum intensity MI(i) among a plurality of pixels included in one cluster is extracted for each of the clusters, and this largest value is set to be the representative maximum intensity MI(cj) for that cluster. Then, the mass-to-charge ratio m/z(cj), the representative maximum intensity MI(cj), the pixel numbers px(cj) of the pixels included in the cluster, and other information are memorized for each cluster (Step S5).

Next, the representative maximum intensities MI(cj) for all the clusters are read out, the clusters are sorted in descending order of the representative maximum intensities MI(cj), and the cluster numbers cj are reassigned in accordance with the new order. As a result, cluster number c1 is assigned to the cluster having the largest representative maximum intensity MI(cj), and the representative maximum intensity MI(cj) decreases as the cluster number cj increases. The reassigned cluster numbers cj are displayed with their representative maximum intensity MI(cj) on the display unit 7. The analysis operator can consult them in selecting clusters (Step S6).

For example, pixels included in a cluster with an extremely small representative maximum intensity MI(cj) compared to the other representative maximum intensities are unlikely to be essential for understanding the tissue structure. Then, by reference to the displayed representative maximum intensities MI(cj), the operator selects one or more clusters whose spatial distribution needs to be visually checked (Step S7). On receiving this instruction, the data processor 2 assigns a different color to each of the clusters selected by the operator, creates a two-dimensional cluster image in which pixels included in the clusters are colored, and displays that image on a window of the display unit 7 (Step S8).

FIG. 3 shows an example where three clusters with cluster numbers c1, c2, and c3 are selected. On the cluster image which corresponds to the two-dimensional measurement area 8a, the pixels belonging to these clusters are displayed in different colors (in grayscale in FIG. 3) for each cluster. Pixels displayed in the same color on this image have the same substance as the most abundant substance. Therefore, the portions where the same substance is mainly distributed are shown in the same color, thus presenting a clear picture of the tissue structure or other properties of the sample.

Further, the data processor 2 computes the integrated mass spectrum of all the pixels, and displays this integrated mass spectrum on the same window as the cluster image. At the same time, the peak or peaks of the mass-to-charge ratio (e.g. $M_1 \pm \Delta M$ in FIG. 3) corresponding to the cluster which has been previously specified by the operator are displayed in the same color as the specified cluster on the cluster image (Step S9). For example, if the display color of the cluster having a mass-to-charge ratio of $M_1 \pm \Delta M$ in FIG. 3 is red, the peaks appearing within the mass-to-charge ratio range of $M_1 \pm \Delta M$ are also displayed in red on the integrated mass spectrum. This enables the user to see the spatial distribution of the specified substance on the cluster image and check the mass-to-charge ratio and the intensity (i.e. the total content) of the substance on the integrated mass spectrum. In addition, on the integrated mass spectrum, it is preferable to label at least the colored peak or peaks with the value of their mass-to-charge ratio using the same color.

FIG. 4 schematically shows the structure of a cluster image with a plurality of clusters shown in different colors. The maximum intensities MI(i) of the mass spectrum data of each pixel are located in a three-dimensional space with two axes x and y representing the space coordinates on the sample 8 and another axis representing the mass-to-charge ratio m/z. In FIG. 4, the rectangular area (hatched or shaded area) immediately above the pixel 8b indicates the maximum intensity MI(i).

In the case where two or more pixels have the same mass-to-charge ratio m/z(i) that gives the maximum intensity MI(i), the maximum intensities MI(i) corresponding to these pixels are located on a plane, such as P1 or P2, which is parallel to the x-y plane along the m/z axis. One plane corresponds to one cluster, i.e. one substance, and the distribution of the maximum intensities MI(i) on one plane corresponds to the distribution of the pixels included in one cluster. Therefore, when a display color is assigned to one cluster, the areas occupied by the maximum intensity MI(i) on the plane corresponding to the cluster also become colored, The images of the plurality of colored planes projected onto the x-y plane forms the cluster image. Hence, the cluster image displayed in the apparatus of the present embodiment can be considered to be an image on which the spatial distributions of different substances are mutually superimposed in different display colors.

A specific example of the previously described data processing will be described with reference to FIGS. 5 and 6. In this example, a mouse retina was used as a sample. FIG. 5(a) shows an optical microscope image of this sample. The two-dimensional area set on this sample consists of 101×98 (=9898) pixels, and the mass spectrum across a mass-to-charge ratio range of m/z500 through 1000 was measured for each pixel.

FIG. 5(c) shows the integrated mass spectrum based on the mass spectrum data obtained for all the pixels. FIG. 5(b) shows an MS image (a mapping image) of m/z761 which gave the peak of the maximum intensity in this integrated mass spectrum. Comparing FIGS. 5(a) and (b) demonstrates that the distribution of the substance of m/z761 significantly corresponds to the structure of the mouse retina. In the case of using conventional MS image display software, by reference to such an integrated mass spectrum, an analysis operator must specify mass-to-charge ratios one by one to display an MS image.

On the other hand, the data processing of the present embodiment as previously described is performed in the following manner. For example, the mass spectrum of the pixel with pixel number i=5 is as shown in FIG. 5(d). In this mass spectrum, the maximum intensity of the peak signal is 6182, and the mass-to-charge ratio of the peak is 545. Hence, m/z (5)=545 and MI(5)=6182. The operations in Steps S2 and S3 are performed for all the pixels of i=1 through 9898 to obtain m/z(i) and MI(i). Then, the clustering operation in Step S4 is performed in accordance with the values of m/z(i).

In performing the clustering, the allowable range $\Delta M$ of the mass-to-charge ratio was set at ±3.5. Under such a condition, the number of pixels having the maximum intensity MI at m/z545 is 2410, such as m/z(13)=546, m/z(22)=543, etc. These pixels are included in one cluster. In this manner, two or more clusters are created, and the m/z(cj), the representative maximum intensity MI(cj), the pixel number px(cj) of the included pixels, and other information are memorized for each cluster. Then, the cluster numbers are reassigned in descending order of the representative maximum intensities MI(cj). After that, this information is presented to the user.

For example, if an operation for displaying six clusters having the first through sixth largest representative maximum intensities MI(cj) is performed by the operator, the apparatus assigns display colors to the pixels included in the specified clusters of cj=c1 through c6, using a different color for each cluster. Then, a colored cluster image as shown in FIG. 6(a) is created and displayed on a window of the display unit 7. In this embodiment, the pixels of px(c1), px(c2), . . . and px(c6), which are included in the six clusters of the cluster number of c1 through c6, are respectively displayed in red, blue, green, purple, light blue, and yellow. All the pixels of px(c7), px(c8), included in the clusters having cluster numbers of c7 and greater are displayed in black.

FIG. 6(b) shows an example of the integrated mass spectrum of all the pixels in which the peaks having m/z corresponding to the clusters selected by the user are displayed in color. The colors of the peaks, i.e. red, blue, green, purple, light blue, and yellow, correspond to the colors of the pixels on the cluster image shown in FIG. 6(a). For example, the cluster number c1 is displayed in red on the cluster image, and the peak of m/z(c1) (=m/z545), which corresponds to this cluster, is also displayed in red on the integrated mass spectrum.

Modification Example

The data processing method described in the previous embodiment can be modified in the following manner for example.

In the previously described embodiment, the entire mass-to-charge ratio range of the obtained mass spectrum data is searched for a peak giving the maximum intensity MI(i). However, in some cases, it is possible to limit the mass-to-charge ratio range to be searched for the peak giving the maximum intensity MI(i). This can be achieved by modifying Step S2 of the flowchart shown in FIG. 2 so that the maximum intensity will be searched for within a limited mass-to-charge ratio range. This processing is effective when the mass-tocharge ratio range of the target substance is previously known. This saves a needless processing, which brings about advantageous effects such as: the shortening of the processing time or a reduction in the processing load on hardware devices (i.e. computer).

The same effect can also be obtained by excluding the mass-to-charge ratio or ratios corresponding to any peak which does not need to be analyzed (e.g. a peak originating from the matrix) among a large number of peaks appearing on the mass spectrum.

In addition, it is also possible to allow the operator to indicate that one or more clusters with a large maximum intensity are purposely excluded from the clusters to be displayed, rather than allowing the user to specify clusters to be displayed in descending order of the maximum intensities. For example, if the pixels px(c1) are distributed evenly on the entire display region and the structure of the sample itself cannot be observed well, the pixels of px(c2), px(c3), . . . , and px(c7) may be colored excluding the pixels px(c1), so that the structure information can be understood more easily. This can be achieved by modifying Step S2 of the flowchart shown in FIG. 2 so as to extract the maximum intensity MI(i) and the mass-to-charge ratio m/z(i) thereof while excluding the mass-to-charge ratio corresponding to the cluster that has been excluded by the operator.

FIGS. 7 and 8 show actual measurement examples for which such a processing is effective.

FIG. 7 shows an actual measurement example in which a mouse brain was used as a sample. FIG. 7(a) is an optical microscope image, and FIGS. 7(b) and 7(c) each show a cluster image and an integrated spectrum created by the data processing method of the aforementioned embodiment. The interval between the measurement points, or pixels, on the sample was 10 μm, and the number of pixels in the two-dimensional area specified as the measurement target on the sample was 250×250. Mass spectrum data across a mass-to-charge ratio range of m/z700 through 855 were collected for each pixel.

The cluster image shown in FIG. 7(b) was created by assigning different colors to the pixels px(c1), px(c2), . . . , and px(c6) respectively included in six clusters cj=c1 through c6 having the first through sixth largest representative maximum intensities MI(cj). In this cluster image, the first cluster c1 (shown in red) at m/z799 is distributed throughout the brain, which renders the displayed brain structure unclear. The cluster image shown in FIG. 7(c) was created by assigning different colors to the pixels px(c3), px(c4), . . . , and px(c8) respectively included in six clusters cj=c3 through c8 having the third through eighth largest representative maximum intensities MI(cj). In this case, the two clusters cj=c1 and c2 having the first and second largest representative maximum intensities MI(cj) were excluded. This cluster image clearly shows the substances which are distributed not throughout the brain but locally or specifically, which renders the displayed brain structure clear.

FIG. 8 shows an actual measurement example in which a ginger slice was used as a sample. FIG. 8(a) is an optical microscope image, and FIGS. 8(b) and 8(c) each show a cluster image and an integrated spectrum created by the data processing method of the aforementioned embodiment. The interval between the measurement points, or pixels, on the sample was 10 μm, and the number of pixels in the two-dimensional area specified as the measurement target on the sample was 61×61. Mass spectrum data across a mass-to-charge ratio range of m/z50 through 800 were collected for each pixel.

The cluster image shown in FIG. 8(b) was created by assigning different colors to the pixels px(c1), px(c2), . . . , and px(c6) respectively included in six clusters cj=c1 through c6 having the first through sixth largest representative maximum intensities MI(cj). This cluster image shows that the substance of m/z193 is distributed in a granular form (or in aggregates larger than a pixel). However, the granular distribution of the other substances is not discernable from this image. The cluster image shown in FIG. 8(c) was created by assigning different colors to the pixels px(c3), px(c4), . . . , and px(c8) respectively included in six clusters cj=c3 through c8 having the third through eighth largest representative maximum intensities MI(cj). In this case, the two clusters cj=c1 and c2 having the first and second largest representative maximum intensities MI(cj) were excluded. This cluster image shows that the substance of m/z187 is also distributed in a granular form, which could not be discerned on the cluster image shown in FIG. 8(b).

As a modification example of the aforementioned embodiment, in Step S9 of the flowchart shown in FIG. 2, an average mass spectrum of all the pixels may be used in place of the integrated mass spectrum of all the pixels. Alternatively, a mass spectrum in which the mass-to-charge ratio m/z(i) and the maximum intensity MI(i) are coupled may be displayed.

It should be noted that if any adjustment, modification, or addition is made within the spirit of the present invention in relation to respects which were not mentioned, it is also included in the scope of the claims of the present application.

What is claimed is:

1. A mass analysis data processing method for processing data collected comprising:
   performing a mass analysis on each of a plurality of micro areas set within a two-dimensional area on a sample, which comprises:
   a) extracting a mass-to-charge ratio giving a maximum intensity for each of the micro areas, based on mass spectrum data corresponding to the micro area;
   b) distributing the micro areas into a plurality of clusters based on the mass-to-charge ratio extracted; and
   c) creating a colored two-dimensional image corresponding to a whole or a part of the two-dimensional area by assigning, for given one or more clusters among the plurality of clusters, a display color to a micro area or micro areas belonging to the clusters, the display color being different for each cluster, and for displaying the colored two-dimensional image.

2. The mass analysis data processing method according to claim 1, further comprising:
   d) obtaining an integrated mass spectrum by integrating the mass spectrum data corresponding to all the micro areas; and
   e) displaying the integrated mass spectrum, while assigning a same color of the cluster or clusters to which the display color has been assigned to a peak or peaks corresponding to the cluster or clusters.

3. A mass analysis data processing apparatus for processing data collected by performing a mass analysis on each of a plurality of micro areas set in a two-dimensional area on a sample, comprising:
   a) an information extracting means for extracting a mass-to-charge ratio giving a maximum intensity for each of the micro areas, based on mass spectrum data corresponding to the micro area;
   b) a clustering means for distributing the micro areas into a plurality of clusters based on the mass-to-charge ratio obtained by the information extracting means; and c) a display information forming means for creating a colored two-dimensional image corresponding to a whole or a part of the two-dimensional area by assigning, for given one or more clusters among the plurality of clusters, a display color to a micro area or micro areas belonging to the clusters, the display color being different for each cluster, and for displaying the colored two-dimensional image.

4. The mass analysis data processing apparatus according to claim 3, further comprising an integral computing means for obtaining an integrated mass spectrum which is computed by integrating the mass spectrum data corresponding to all the micro areas, wherein the display information forming means displays the integrated mass spectrum on the display window while assigning a same color of the cluster or clusters to which the display color has been assigned in creating the colored two-dimensional image to a peak or peaks corresponding to the cluster or clusters.

5. The mass analysis data processing apparatus according to claim 4, wherein the display information forming means also displays at least a value of a mass-to-charge ratio corresponding to a colored peak on the integrated mass spectrum displayed on the display window.

6. The mass analysis data processing apparatus according to claim 3, wherein the information extracting means extracts a mass-to-charge ratio giving a maximum intensity for a specified mass-to-charge ratio range, or for a mass-to-charge ratio range excluding a specified value of range of the mass-to-charge ratio.

* * * * *